Patented Dec. 3, 1935

2,022,973

UNITED STATES PATENT OFFICE 2,022,973

ROSIN DRYING OIL AND PROCESS OF PRODUCING THE SAME

Robert C. Palmer and Paul O. Powers, Pensacola, Fla., assignors to Newport Industries, Inc., Milwaukee, Wis., a corporation of Delaware No Drawing. Application December 16, 1931, Serial No. 581,506

20 Claims. (Cl. 134—56)

This invention relates to a process of producing novel and technically useful decomposition products from rosin and embraces the novel products thus produced.

More specifically this invention relates to the preparation of oily products from rosin which are valuable substitutes for linseed oil in the preparation of printing inks and varnishes.

It has heretofore been proposed to use rosin oil as an ingredient in printing inks. To the best of our knowledge, however, rosin oil has not been used to replace drying oils, such as linseed oil, in the preparation of printing inks and other compositions in which drying oils are normally present as ingredients. It is known that rosin oil, by itself, is not adapted to completely take the place of linseed oil, for several reasons. Some of these reasons are (1) bad odor, (2) poor dispersion properties, and (3) acidity. While some of these objectionable features may be removed by simple treatment, no treatment has heretofore been known to completely remove all of the objections. For example, if the rosin oil be produced by destructive distillation of rosin, redistillation and fractionation, particularly redistillation over an alkali, there may be produced a fraction substantially free of bad odor and acidity. However the dispersion properties of rosin oil are not improved by such treatments. We have now devised a suitable treatment whereby novel drying oils may be derived from rosin and esters of rosin. Our novel drying oils are free from the objectionable properties of rosin oil and have the added advantage that they do not develop objectionable odors upon oxidation as is the case with linseed oil.

Our novel drying oils are not rosin oils, but differ therefrom both in physical properties and in chemical composition.

In general the methods of preparing our novel drying oils comprise heating a partially esterified rosin with an active clay, such as fuller's earth, until most of the rosin acids of the mass are destroyed. Optionally, the product at the end of the heating process may be further esterified to further reduce the residual acidity. The product is finally subjected to partial distillation to remove some of the more volatile and odoriferous constituents.

It is therefore an object of this invention to produce a drying oil from rosin which can be used as a substitute for linseed oil in the preparation of printing inks and varnishes.

It is another object of this invention to provide a novel process whereby valuable oily products are obtained from rosin.

Other and further important objects of this invention will become apparent as the description proceeds.

We may select either gum or wood rosin as the principal part of our starting material. Either dark rosins, such as "FF" wood rosins or the lighter colored grades of either gum or wood rosin may be used. A portion of the rosin selected is then esterified in amounts, say not exceeding 50%, by means of a polyhydric alcohol, such as for example glycerine, ethylene glycol, diethylene glycol, triethylene glycol, diglycerol or mannitol in any known manner, such as by merely heating the proper proportion of the two ingredients together. A small portion, for example from 3 to 5% by weight of an active clay such as fuller's earth is then added and the mixture is heated for several hours at a temperature between about 260–325° C. The heat treatment is preferably effected by placing the esterified rosin in a closed vessel provided with a vapor vent to allow the escape of steam or oily material. Trays, such as wire screen baskets, are provided inside the vessel to prevent the active clay from being mixed with the rosin product. The mass is heated, within the above temperature limits, until the acid number has been reduced to below 25, preferably to about 15. During the heating treatment the greater portion of the rosin acids are destroyed and some of the more volatile decomposition products such as light oils and water distill off. The heating of the residual mass is continued with a sufficient additional proportion of glycerine to bring the acid number below about 10, preferably down to 5. However this latter addition of glycerine may be omitted and the original heating may be continued until the acid number is reduced to the desired final figure.

Alternatively, in the heat treatment operation, the closed vessel may be provided with a reflux condenser to recover the volatile products. In this operation, enough water of decomposition is formed to induce steam distillation of some of the oily decomposition products which are being formed in the reaction. This oil may be later separated from the water and mixed with the rest of the decomposition products.

We have found that a small proportion of calcium or magnesium resinate hastens the rate of decomposition. We may therefore, instead of starting with rosin alone, start with rosin and a small amount of lime, for example about one-half of 1% by weight of the rosin.

The product may finally be distilled under vacuum or by aid of steam and a small fraction removed until the proper odor and desired viscosity are obtained. The amount removed, to give satisfactory results, generally varies from about 3 to 10% by weight of the rosin.

Instead of esterifying rosin prior to decomposition we have found that a mixture of rosin and esters of polyhydric alcohols other than rosin esters may be used. The esters apparently undergo decomposition in the presence of rosin when heated at 260–325° C. with fuller's earth and lead ultimately to a rosin-decomposition product of the same desirable characteristics described above. Thus, we may add some linseed oil (a glycerol ester of linoleic acid) to the rosin, for example about 5 to 25% by weight of the rosin, and proceed with the decomposition as before described until the final acid number is reduced to about 15. When linseed oil is treated alone with fuller's earth in this manner, the ester is partially hydrolized and the free acid is liberated. This liberated acid is not, however, subject to decomposition with the fuller's earth, as is the case with the acid material liberated from glycerol abietate. Consequently the resultant product has a higher acid number at the end than the original linseed oil. If a more neutral product is desired, the reaction product may be treated with a small amount of glycerol or other polyhydric alcohol say 2% by heating at 280–290° C. until esterification of the free acid is effected.

We have found that various compositions of rosin and glycerol ester of rosin, natural vegetable oils or materials containing esters of other polyhydric alcohols may be used as starting materials for our novel product. In using the term "natural vegetable oils" we are hereinafter referring to substances such as linseed oil, Chinawood oil, castor oil, cotton seed oil, cocoanut oil and the like. We have also found that animal oils such as for example, whale oil, may be used. All of the natural oils and fats which are glycerides of the fatty acids are believed to be operative and mixtures of rosin with any one or more of these esters may be used as an initial material.

Our novel products are particularly adapted to be used as vehicles for the manufacture of so-called non-bronzing inks. They may, however, also be used as vehicles for inks of the bronzing variety, provided a softening agent such as a petroleum lubricating oil or other plasticizer has been added to them for the purpose of correcting their "bronzing" tendency, as is more fully described in our copending application Serial No. 581,507 filed of even date herewith.

The following examples will serve to illustrate our invention specifically, but it should be understood that our invention is not to be limited thereto since it is susceptible of wide variations and modifications. The parts given in the examples are parts by weight.

*Example 1*

100 parts of grade "FF" wood rosin are heated together with 1 part of glycerol at about 270 to 280° C. for about 2 hours. 3 to 5 parts of dry natural fuller's earth coarse mesh are added to the mass and the mixture is then heated for a period of about 4 to 8 hours at a maximum temperature of 300° C. At the end of this period 10 parts of linseed oil are added and the heating is continued for 2 to 3 hours at the same temperature. During this treatment a distillate equivalent to about 8% by weight of the original rosin distills over. This distillate contains among other ingredients, the water of decomposition. The residual mass now has an acid number below 10. The mass is next partially cooled and is then subjected to distillation under a 29 inch vacuum at a temperature of about 150 to 200° C. (measured in the still) until about 5% by weight thereof is distilled off. The distillate constitutes a light oil and its removal increases the viscosity of the remaining mass and removes the objectionable odor. If desired, the light oil fraction may be separated from the main mass by steam distillation, at atmospheric pressure, and at a temperature of about 200 to 230° C. The residual mass in the still is now cooled and separated from the fuller's earth. The product is a viscous oil of reddish brown color by transmitted light and dark green by reflected light. It has no true boiling range. The specific gravity is .990 to 1.00; optical rotation about +10; acid number, below 10; saponification number 20 to 30. Upon addition of .05% of a cobalt dryer, the product will dry to a film with an increase in weight of about 10%.

The product is adapted for use as a substitute for linseed oil in the preparation of printing inks or similar compositions as above indicated. When used in such capacity, it is preferably mixed with a metallic dryer, such as for example salts of cobalt or manganese. These salts act to accelerate the drying rate of the product. When cobalt is used the preferred proportions are about .05% to .10% by weight of the product although other proportions may be used as will be readily understood to those skilled in the art.

*Example 2*

100 parts of grade "FF" wood rosin and 1 part of glycerol are heated together at a temperature of about 270 to 280° C. for a period of about 2 hours. 3 to 5 parts of dry natural fuller's earth, as used in Example 1, are now added and the mixture is heated at a maximum of 300° C. until the acid number of the mass is reduced to below 10. The mass is then partially cooled and subjected to distillation under vacuum or by the aid of steam as indicated in Example 1. The residual mass in the still is next cooled and separated from the fuller's earth. The product, like the product in Example 1 is a viscous oil having the desired characteristics indicated.

*Example 3*

Repeat Example 2 using grade "M" wood rosin in place of the "FF" grade. The resulting product is a faster drying oil than that obtained in Example 2.

Many variations in procedure may be practiced without departing from the spirit of our invention. Thus, for example the amount of glycerine used may be varied within wide limits. If desired, a completely esterified rosin may be used as a starting material and may be heated directly with the active clay. However, as pointed out, the preferred results are obtained when the rosin is only partially esterified having an ester content of about 10 to 30%.

The drying oils produced by our process vary considerably in the time required to dry them to a hard film. This depends on the purity of the rosin used as a starting material, the darker rosins, such as "FF" grade wood rosin producing slower drying oils than the rosins of higher grade such as "M". We have found that the reason for this is the presence of a small amount of antioxidizing material in the unpurified grade "FF" rosin. This anti-oxidizing material goes through the process unchanged.

In order to make a drying oil produced from "FF" grade rosin equal in drying speed to one produced from a higher grade rosin such as grade "M", we have discovered that the slower drying oil may be treated in approximately the same manner as in the processes used for decolorizing rosin. The decolorizing treatment need not be carried to the point of removing all of the color bodies of the rosin product and is therefore less expensive than a decolorizing treatment used to totally remove the color bodies.

For example, we have discovered that a drying oil produced from grade "FF" wood rosin may be made to dry as rapidly as one produced from grade "M" wood rosin by filtration through fuller's earth in the ratio of ½ part of earth to 1 part of oil whereby about 5% by weight of the impurities are removed. These impurities which are absorbed by the earth are of a black sticky nature.

A simple way to effect the filtration through fuller's earth is to dissolve the drying oil in petroleum naphtha to make about a 25% solution. The solution is then filtered cold through a bed of fuller's earth and after filtration may be separated from the petroleum naphtha by steam or dry distillation. We have found that in making a non-bronzing ink as described in our copending application Serial No. 581,507 it is not necessary to remove the last traces of petroleum naphtha solvent before adding the softening agent as the last traces of solvent are readily removed along with the odoriferous constituents in the final vacuum distillation step.

The temperature and time of heating in the preparation of our novel drying oils may be varied within wide limits since the controlling factor is the desired viscosity and acid number of the final product. The percentage of fuller's earth also may be varied from about 1 to 10% by weight of the rosin present.

The amount of light oil "topped off" by the partial vacuum or steam distillation at the end of the reaction may be varied through wide limits depending on the desired viscosity in the final product and the desired odor.

Any degree of fineness of fuller's earth may be selected for the reaction. The object of the coarse mesh indicated in the specific examples is merely to facilitate removal from the drying oil.

We claim as our invention:

1. In the process of producing technically useful oily products from rosin, the step which comprises subjecting a mixture of rosin and a rosin ester of a polyhydric alcohol to the decomposing action of fuller's earth and heat until the acid value of the mixture has been considerably reduced.

2. In the process of producing oily products from rosin, the step which comprises subjecting a mixture of rosin and a natural vegetable ester selected from the group consisting of linseed oil, China wood oil, castor oil, cottonseed oil and cocoanut oil to the decomposing action of fuller's earth and heat until the acid value of the mixture has been considerably reduced.

3. In the process of treating wood rosin to produce technically useful oily products, the step which comprises heating at temperatures of about 260 to 325 degrees C. partially esterified wood rosin with fuller's earth until the acid value of the mixture has been considerably reduced.

4. In the process of treating wood rosin to produce technically useful oily products, the step which comprises heating at temperatures of about 260 to 325 degrees C. a mixture of wood rosin and the glycerol ester of wood rosin in the presence of fuller's earth until the acid value of the mixture has been considerably reduced.

5. The process of treating wood rosin to produce technically useful oily products which comprises heating at temperatures of about 260 to 325 degrees C. a mixture of wood rosin and the glycerol ester of wood rosin in the presence of fuller's earth until the acid value of the mixture has been reduced to below 25 and esterifying the product until its acid value is further reduced to below 10.

6. The process of treating wood rosin to produce technically useful oily products which comprises heating at temperatures of about 260 to 325 degrees C. a mixture of wood rosin and the glycerol ester of wood rosin in the presence of fuller's earth until the acid value of the mixture has been reduced to about 15, adding glycerol and further heating until the acid value has been reduced to about 5.

7. In the process of producing oily products from wood rosin, the step which comprises heating at temperatures of about 260 to 325 degrees C. a mixture of wood rosin and the glycerol ester of wood rosin in the presence of fuller's earth until the acid value of the mixture has been reduced to about 5.

8. The process of preparing a drying oil which comprises subjecting a mixture of rosin and a rosin ester of a polyhydric alcohol to the decomposing action of fuller's earth and heat until the acid value of the mixture has been considerably reduced, further treating the mass to reduce the residual acid value, and removing the more volatile constituents of the final product.

9. The process of preparing a drying oil useful in the varnish and printing-ink industry, which comprises heating a mixture of wood rosin and an ester of wood rosin with fuller's earth until the acid value of the mixture has been reduced to below 25, adding glycerol and continuing the heating until the acid value drops to below 10, distilling off a fraction not exceeding 10% by weight of the initial material, and recovering the residual mass.

10. In the process of preparing a drying oil from wood rosin, the steps comprising heating a mixture of wood rosin and an ester of wood rosin with fuller's earth until the acid value of the mixture has been reduced to below 10 and removing a fraction not exceeding 10% by weight of the initial material by distillation.

11. The process of producing technically useful oil products from rosin which comprises heating a partially esterified grade of rosin with fuller's earth at temperatures above 230° C. but below about 325 degrees C., removing the more volatile constituents of the products and separating the product from the fuller's earth.

12. The process of producing a rosin drying oil adapted for use as a vehicle for bronzing inks, which comprises heating wood rosin and an ester of wood rosin in the presence of fuller's earth until the acid value of the mixture has been reduced below 10, partially evaporating the product to remove the more highly volatile constituents of the mass and separating the residual mass from the fuller's earth.

13. As a new composition of matter, a drying oil comprising the products formed from the decomposing action of fuller's earth and heat on a mixture of wood rosin and an ester of wood rosin, said oil being a viscous liquid of reddish brown color by transmitted light and light green by reflecting light, said oil possessing an acid value of not higher than 10, a specific gravity of 0.99 to 1.00 and a saponification value of 20 to 30, said oil being further characterized by rapid drying qualities in the presence of cobalt salts without development of objectionable odors.

14. In the process of producing a drying oil from rosin including the heating of a mixture of rosin and an ester of a polyhydric alcohol in the presence of an active clay, the step of increasing the drying speed of the resulting oil by filtering the said drying oil through fuller's earth.

15. The process of producing technically useful oil products from rosin which comprises heating at temperatures of about 260 to 325 degrees C. a mixture of rosin and a rosin ester of a polyhydric alcohol in the presence of fuller's earth until the greater portion of the rosin acids present are destroyed.

16. A drying oil comprising the products obtained by the decomposing action of fuller's earth and heat on a mixture of rosin and a polyhydric alcohol ester of rosin, said product having the greater part of the initial unesterified rosin acids in the mixture destroyed, said oil being a viscous liquid of reddish brown color by transmitted light and light green color by reflected light and being further characterized by rapid drying qualities in the presence of cobalt salts without development of objectionable odors.

17. A drying oil comprising the products obtained by the decomposing action of fuller's earth and heat on a partly esterified wood rosin and having the greater part of the unesterified rosin acids destroyed, said product being a viscous liquid of reddish brown color by transmitted light and green color by reflected light and being further characterized by rapid drying qualities in the presence of cobalt salts without development of objectionable odors.

18. The process of producing technically useful oily decomposition products from rosin which comprises heating at temperatures of about 260 to 325 degrees C. a mixture of rosin and a natural vegetable ester selected from the group consisting of linseed oil, castor oil, cottonseed oil, cocoanut oil and tung oil in the presence of fuller's earth until the acid value of the mixture has been considerably reduced.

19. A new composition of matter adapted to be used as a drying oil comprising the product obtained by the decomposing action of fuller's earth and heat on a mixture of rosin, a polyhydric alcohol ester of rosin and a natural vegetable oil selected from the group consisting of linseed oil, castor oil, cotton-seed oil, cocoanut oil and tung oil, said product having an acid number considerably lower than the acid number of the original mixture, and being a viscous liquid characterized by rapid drying qualities in the presence of cobalt salts without development of objectionable odors.

20. In the process of preparing technically useful oil products from rosin, the step which comprises subjecting a mixture of rosin, a polyhydric alcohol ester of rosin and a natural vegetable ester of the class consisting of linseed oil, China wood oil, castor oil, cottonseed oil and cocoanut oil to the decomposing action of fuller's earth and heat until the greater portion of the rosin acids in the mixture are destroyed.

ROBERT C. PALMER.
PAUL O. POWERS.